US012115847B2

(12) United States Patent
Shynn et al.

(10) Patent No.: US 12,115,847 B2
(45) Date of Patent: Oct. 15, 2024

(54) BATTERY HOUSING ASSEMBLY HAVING STRIKE BAR

(71) Applicant: Ford Global Technologies, LLC, Dearborn, MI (US)

(72) Inventors: Matthew David George Shynn, Chelmsford (GB); Edward Ball, London (GB); John Marsh, Rayleigh (GB)

(73) Assignee: Ford Global Technologies, LLC, Dearborn, MI (US)

( * ) Notice: Subject to any disclaimer, the term of this patent is extended or adjusted under 35 U.S.C. 154(b) by 365 days.

(21) Appl. No.: 17/736,392

(22) Filed: May 4, 2022

(65) Prior Publication Data

US 2023/0356580 A1 Nov. 9, 2023

(51) Int. Cl.
*B60K 1/04* (2019.01)
*B60L 50/64* (2019.01)
*H01M 50/242* (2021.01)

(52) U.S. Cl.
CPC ............ *B60K 1/04* (2013.01); *H01M 50/242* (2021.01); *B60L 50/64* (2019.02); *B60Y 2200/91* (2013.01); *H01M 2220/20* (2013.01)

(58) Field of Classification Search
CPC ............. B60K 1/04; B60K 2001/0438; H01M 50/242; H01M 2220/20; H01M 50/249; B60L 50/64; B60L 3/0007; B60Y 2200/91; Y02E 60/10
See application file for complete search history.

(56) References Cited

U.S. PATENT DOCUMENTS

| 5,390,754 | A | * | 2/1995 | Masuyama | ............. | B60L 58/18 |
| | | | | | | 180/68.5 |
| 7,926,602 | B2 | * | 4/2011 | Takasaki | ............. | H01M 50/209 |
| | | | | | | 180/68.5 |
| 8,839,895 | B2 | * | 9/2014 | Kato | ........................ | B60K 1/04 |
| | | | | | | 180/68.5 |
| 9,287,595 | B2 | * | 3/2016 | Fujii | .................... | H01M 50/249 |
| 9,660,234 | B2 | * | 5/2017 | Nusier | ................ | H01M 50/224 |
| 9,931,961 | B2 | * | 4/2018 | Nusier | .................... | B60L 50/64 |
| 10,017,037 | B2 | * | 7/2018 | Newman | ............. | H01M 50/271 |
| 10,160,492 | B2 | * | 12/2018 | Fees | ....................... | B60L 3/0015 |

(Continued)

FOREIGN PATENT DOCUMENTS

| CN | 102742044 | A | * | 10/2012 | ............... | B60K 1/04 |
| CN | 107150581 | A | * | 9/2017 | ............... | B60K 1/04 |

(Continued)

*Primary Examiner* — James A Shriver, II
*Assistant Examiner* — Ian Bryce Shelton
(74) *Attorney, Agent, or Firm* — Burris Law, PLLC

(57) ABSTRACT

A battery housing assembly for an electric vehicle includes a battery housing, at least one mounting structure, and a strike bar. The battery housing is configured to house battery components. The mounting structure is secured to the battery housing and is configured to mount the battery housing to a vehicle frame. The mounting structure includes a recess. The strike bar is disposed within the recess and is secured to the mounting structure. The strike bar extends beyond an exterior profile of the battery housing and includes an upper end portion that tapers inwardly within the recess. The strike bar is configured to detach from the mounting structure in a downward direction during a vehicle impact event.

20 Claims, 6 Drawing Sheets

(56) References Cited

U.S. PATENT DOCUMENTS

| | | | |
|---|---|---|---|
| 10,272,949 B2* | 4/2019 | Faruque | B60K 1/04 |
| 10,322,757 B2* | 6/2019 | Shimoda | B62D 25/20 |
| 10,358,048 B2* | 7/2019 | Hara | H01M 50/262 |
| 10,439,183 B2* | 10/2019 | Nusier | H01M 50/242 |
| 10,632,858 B2* | 4/2020 | Nusier | B60K 1/04 |
| 10,720,620 B1* | 7/2020 | Grace | H01M 50/244 |
| 10,723,385 B2* | 7/2020 | Ayukawa | B62D 25/2009 |
| 11,201,370 B2* | 12/2021 | Hilfrich | B60L 50/66 |
| 11,370,288 B2* | 6/2022 | Sasmaz | B60K 1/04 |
| 11,745,573 B2* | 9/2023 | Caliskan | B62D 27/065 180/68.5 |
| 11,876,239 B2* | 1/2024 | Wassmur | H01M 50/249 |
| 2008/0173488 A1* | 7/2008 | Takasaki | B60R 16/04 180/68.5 |
| 2012/0160583 A1* | 6/2012 | Rawlinson | H01M 50/242 903/952 |
| 2013/0075173 A1* | 3/2013 | Kato | H01M 50/249 180/68.5 |
| 2013/0266840 A1* | 10/2013 | Fujii | H01M 10/613 429/120 |
| 2016/0233464 A1* | 8/2016 | Nusier | H01M 50/242 |
| 2016/0233467 A1* | 8/2016 | Nusier | H01M 50/242 |
| 2016/0288636 A1* | 10/2016 | Kamimura | B62D 25/2036 |
| 2017/0225558 A1* | 8/2017 | Newman | B60K 1/04 |
| 2017/0368959 A1* | 12/2017 | Hara | H01M 50/242 |
| 2018/0072352 A1* | 3/2018 | Shimoda | B60K 6/28 |
| 2018/0105209 A1* | 4/2018 | Fees | H01M 50/249 |
| 2019/0359048 A1* | 11/2019 | Tsuyuzaki | B60K 1/04 |
| 2020/0062098 A1* | 2/2020 | Fukuoka | B60K 1/04 |
| 2020/0198453 A1* | 6/2020 | Hilfrich | H01M 50/202 |
| 2021/0146763 A1* | 5/2021 | Shin | B60L 50/66 |
| 2021/0371011 A1* | 12/2021 | Itoh | B62D 25/2009 |
| 2022/0069403 A1* | 3/2022 | Lim | H01M 50/186 |
| 2022/0320659 A1* | 10/2022 | Munjurulimana | H01M 50/249 |
| 2023/0163390 A1* | 5/2023 | Wassmur | B60K 1/04 180/271 |
| 2023/0198072 A1* | 6/2023 | Lee | H01M 50/224 429/99 |
| 2023/0223635 A1* | 7/2023 | Jeong | H01M 50/262 429/99 |
| 2023/0223661 A1* | 7/2023 | Kim | H01M 50/249 429/163 |
| 2023/0264562 A1* | 8/2023 | Kamemoto et al. | B62D 21/11 180/65.1 |
| 2023/0318106 A1* | 10/2023 | Hase | H01M 50/242 429/176 |
| 2023/0339306 A1* | 10/2023 | Hase | H01M 10/6557 |

FOREIGN PATENT DOCUMENTS

| | | | | |
|---|---|---|---|---|
| CN | 108172733 | | 6/2018 | |
| CN | 108172733 A | * | 6/2018 | |
| CN | 108528542 A | * | 9/2018 | B60K 1/04 |
| CN | 108528542 | | 8/2019 | |
| CN | 114103615 A | * | 3/2022 | B60K 1/00 |
| DE | 102017208597 A1 | * | 12/2017 | B60K 1/04 |
| EP | 1939027 A1 | * | 7/2008 | B60K 1/04 |
| EP | 3825160 A1 | * | 5/2021 | B60K 1/04 |
| KR | 20210058500 A | * | 5/2021 | |
| KR | 102344152 B1 | * | 1/2022 | |
| WO | WO-2018071840 A1 | * | 4/2018 | B60K 1/04 |
| WO | WO-2018153880 A1 | * | 8/2018 | B60K 1/04 |
| WO | WO-2021003299 A1 | * | 1/2021 | B60K 1/04 |
| WO | WO-2021046317 A1 | * | 3/2021 | H01M 10/613 |

\* cited by examiner

BATTERY HOUSING ASSEMBLY HAVING STRIKE BAR

FIELD

The present disclosure relates to a battery housing assembly having a strike bar.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location relative to the electric vehicle, the battery pack may be susceptible to various vehicle loads.

Integration of rechargeable battery packs into the structure of existing vehicles and providing efficient load paths in a variety of operating conditions can be challenging, primarily due to the increased weight of the battery packs and their larger footprint in the vehicle. The present disclosure addresses these issues related to the integration of rechargeable battery packs in electric vehicles.

SUMMARY

This section provides a general summary of the disclosure and is not a comprehensive disclosure of its full scope or all of its features.

In one form, a battery housing assembly for an electric vehicle includes a battery housing, at least one mounting structure, and a strike bar. The battery housing is configured to house battery components. The mounting structure is secured to the battery housing and is configured to mount the battery housing to a vehicle frame. The mounting structure includes a recess. The strike bar is disposed within the recess and is secured to the mounting structure. The strike bar extends beyond an exterior profile of the battery housing and includes an upper end portion that tapers inwardly within the recess. The strike bar is configured to detach from the mounting structure in a downward direction during a vehicle impact event.

In variations of the battery housing assembly of the above paragraph, which may be implemented individually or in any combination: the strike bar is made of an aluminum material; the strike bar is secured to the mounting structure via mechanical fasteners; the strike bar extends an entire length of the battery housing; mounting posts are spaced apart along a length of the mounting structure and extends through the mounting structure, fasteners extend through the mounting posts to secure the battery housing to the vehicle frame; the strike bar is located inboard relative to the mounting posts; the mounting structure comprises an edge that corresponds to the tapered upper end portion of the strike bar; the strike bar includes a pair of tapered upper end portions; the strike bar includes a lower end portion having a cross-sectional area greater than a cross-sectional area of the upper portion; the mounting structure comprises an edge that corresponds to the tapered upper end portion of the strike bar; the mounting structure comprises internal stiffening members; the strike bar includes another upper end portion that tapers inwardly within the recess; and the mounting structure comprises edges that correspond to the tapered upper end portions of the strike bar.

In another form, a battery housing assembly for an electric vehicle includes a battery housing, at least one battery frame, and a strike bar. The battery housing is configured to house battery components. The battery frame is secured to the battery housing and is configured to mount the battery housing to a vehicle frame. The battery frame includes a recess. The strike bar is disposed within the recess and is secured to the battery frame. The strike bar extends beyond an exterior profile of the battery housing. The strike bar includes an upper end portion that tapers inwardly within the recess. The strike bar comprises a stiffness that is greater than a stiffness of the battery frame. The strike bar is configured to detach from the mounting structure in a downward direction during a vehicle impact event.

In yet another form, a battery housing assembly for an electric vehicle includes a battery housing, at least one battery frame, mounting posts, fasteners and a strike bar. The battery housing is configured to house battery components. The battery frame is secured to the battery housing and is configured to mount the battery housing to a vehicle frame. The battery frame includes a recess having an edge. The mounting posts are spaced apart along a length of the battery frame and extends through the battery frame. The fasteners extend through the mounting posts to secure the battery housing to the vehicle frame. The strike bar is disposed within the recess and is secured to the battery frame. The strike bar extends beyond an exterior profile of the battery housing. The strike bar includes an upper end portion that tapers inwardly within the recess. The edge of the recess corresponds to the tapered upper end portion of the strike bar. The strike bar is configured to detach from the mounting structure in a downward direction during a vehicle impact event Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
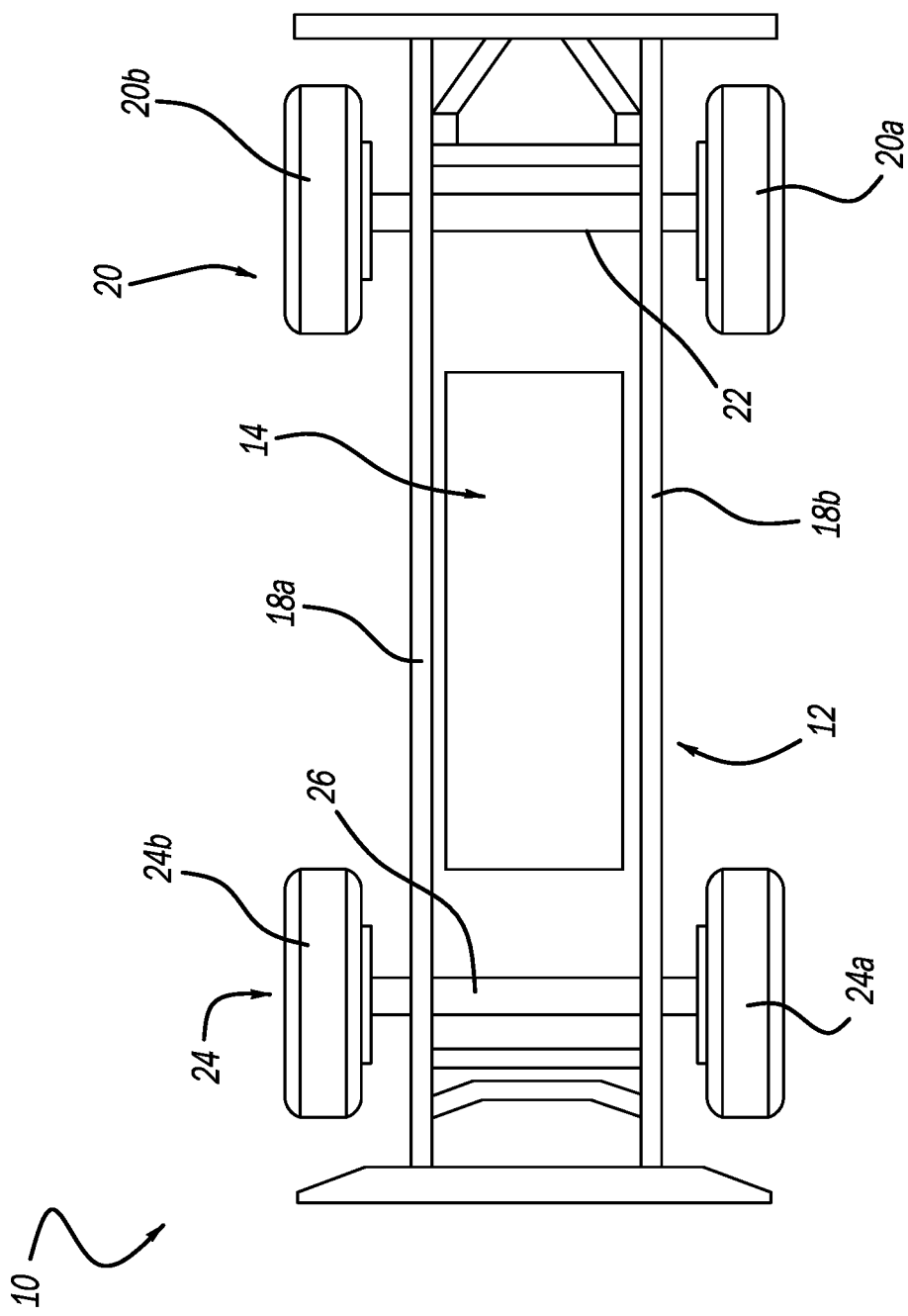
FIG. 1 is a schematic view of a vehicle including a battery housing assembly according to the principles of the present disclosure.
Figure 2:
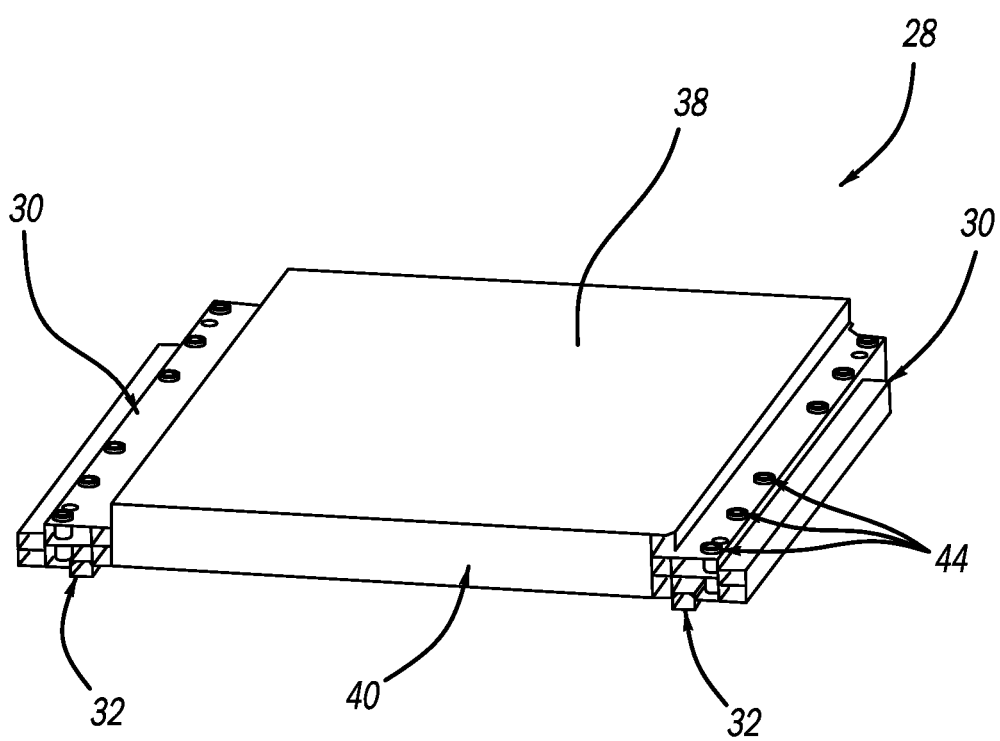
FIG. 2 is a perspective view of the battery housing assembly of FIG. 1.
Figure 3:
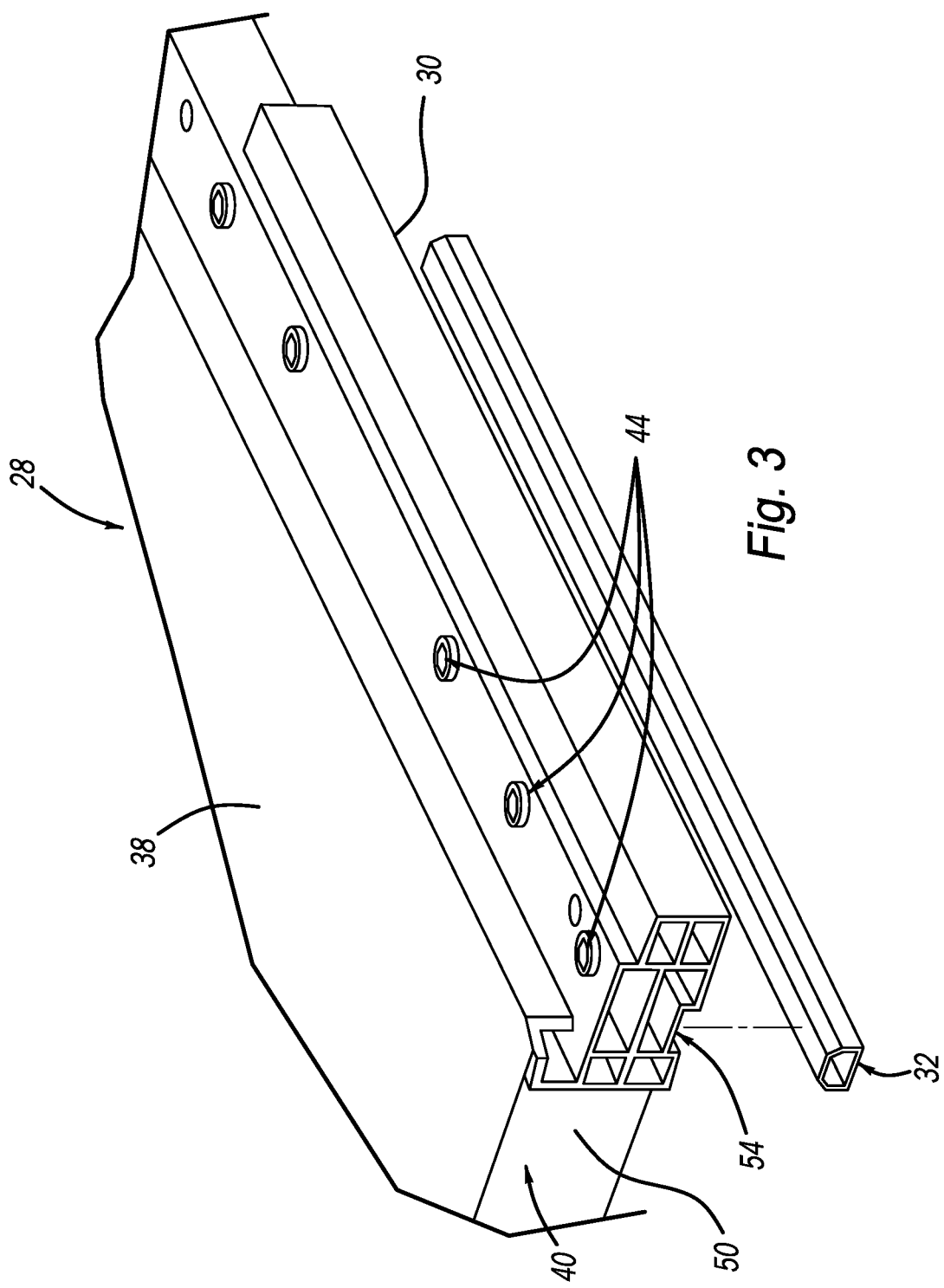
FIG. 3 is a partial perspective view of the battery housing assembly of FIG. 1 with a strike bar exploded from a groove of a mounting structure of the battery housing assembly.
Figure 4:
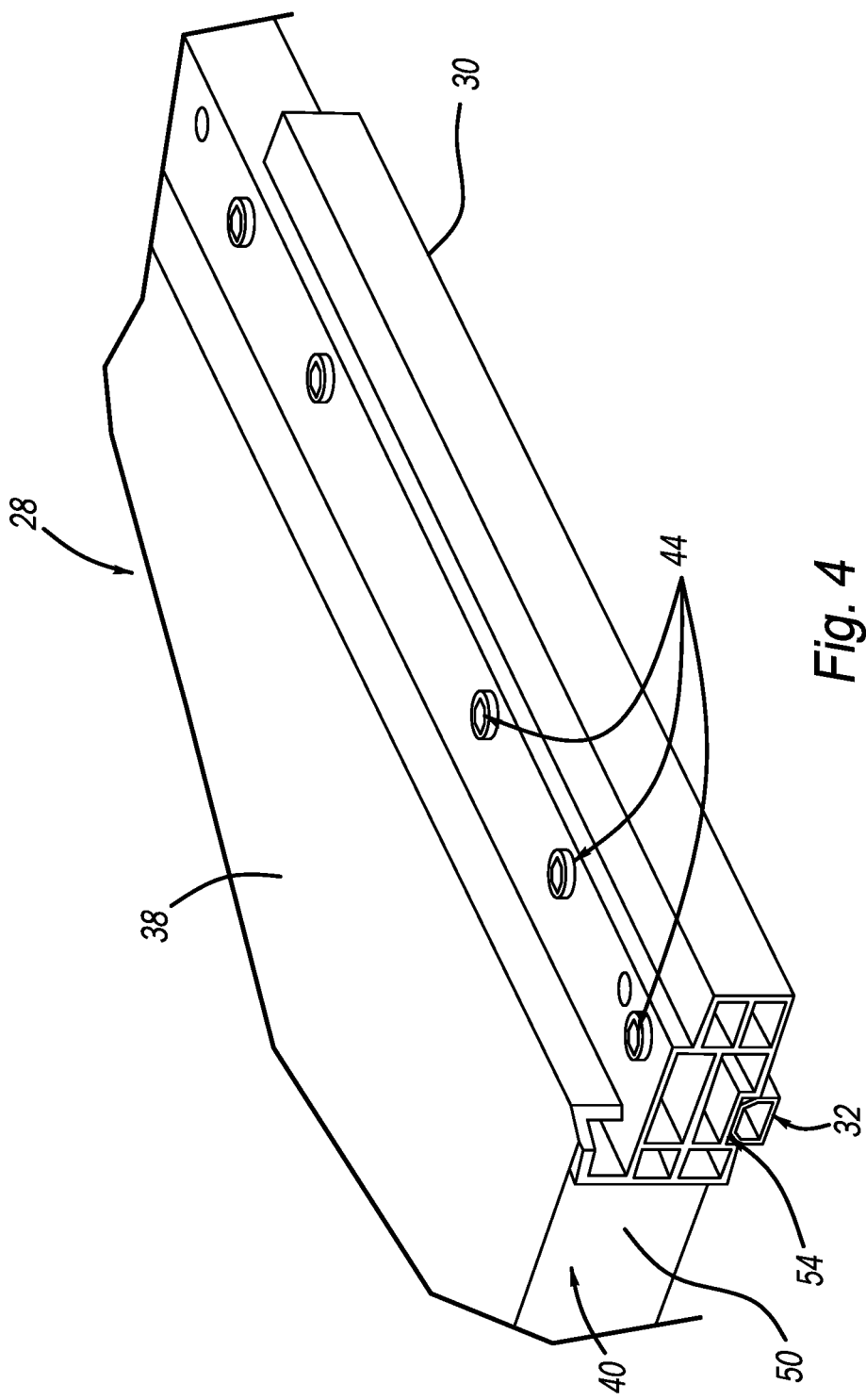
FIG. 4 is a partial perspective view of the battery housing assembly of FIG. 1 with the strike bar disposed within the groove of the mounting structure of the battery housing assembly.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a vehicle frame 12 and a battery housing assembly 14. The vehicle frame 12 is the main supporting structure of the vehicle 10, to which various components are attached either directly or indirectly. The vehicle frame 12 includes opposed longitudinal rails 18a, 18b. The rails 18a, 18b are spaced apart from each other and may establish a length of the vehicle frame 12.

The battery housing assembly 14 powers a rear motor (not shown) to drive rear wheels 20a, 20b of a set of rear wheels 20 via a rear axle 22. Similarly, the battery housing assembly 14 powers a front motor (not shown) to drive front wheels 24a, 24b of a set of front wheels 24 via a front axle 26.

With additional reference to FIGS. 2-5, the battery housing assembly 14 includes one or more battery arrays (not shown), a battery tray or housing 28, a pair of mounting structures or frames 30, and a plurality of strike or striker bars 32. The battery housing 28 is an enclosure which provides a structural surrounding and sealed compartment for the battery arrays and other battery components such as cooling lines, support brackets, and wiring disposed therein. The battery arrays may be rechargeable and may include lithium-ion batteries or any other suitable electrical power storage units. In some forms, the battery arrays are stacked on top of each other.

The battery housing 28 may disposed at various locations of the vehicle 10 and is mounted to the vehicle frame 12. In this way, the battery housing 28 is supported by the vehicle frame 12 and is remote from a passenger cabin (not shown) and cargo compartments (not shown) of the vehicle 10, therefore, not occupying space that would otherwise be available for passengers or cargo. The battery housing 28 includes a cover or lid 38, a body 40, and a seal (not shown). The lid 38 at least partially overlaps the body 40 and is removably coupled to the body 40 via mechanical fasteners such as bolts or screws (not shown), for example. In this way, the lid 38 may be removed to service the battery arrays disposed within the battery housing 28.

The body 40 includes a bottom wall or panel 48 and one or more side walls or panels 50. The bottom wall 48 supports the battery arrays disposed within the battery housing 28 and is secured to lower portions of the side walls 50. For example, the bottom wall 48 is secured to the lower portions of the side walls 50 and/or the mounting structures 30 via welding, an adhesive, or any other suitable attachment means. The side walls 50 are manufactured via stamping, for example, and extend in a vertical direction. The side walls 50 define an outer boundary of the body 40 and are secured to each other via welding or an adhesive, for example. The seal is disposed around a periphery of the side walls 50 of the battery housing 28 and is engaged with side walls 50 and the lid 38. In this way, fluids, debris and other materials are inhibited from entering into the battery housing 28.

Each mounting structure 30 is made of a metal material such as aluminum, for example, and is secured to a side of the body 40 of the battery housing 28. Each mounting structure 30 is also configured to mount the battery housing 28 to the vehicle frame 12. That is, a plurality of mounting posts 44 are spaced apart along a length of the mounting structure 30 and extend through the mounting structure 30. A fastener 46 (FIG. 5) extends through a respective mounting post 44 to secure the battery housing 28 to the vehicle frame 12. The mounting posts 44 are located at or near a middle portion of the mounting structure 30. In the example illustrated, the mounting structure 30 extends substantially a length of the battery housing 28. In other examples, the mounting structure 30 extends only a portion of the battery housing 28.

Each mounting structure 30 includes internal stiffening members 49 that are configured to absorb energy during a side vehicle impact event. In the example illustrated, the internal stiffening members 49 may be ribs or webbing. In other examples, a foam material may be provided instead of, or in addition to, the internal stiffening members 49 to further absorb energy during a side vehicle impact event.

Each strike bar 32 is secured to a respective mounting structure 30 and extends beyond an exterior profile of the battery housing 28. Stated differently, each strike bar 32 is disposed in a groove or recess 54 located at or near a lower end of the mounting structure 30 and extends downward past the battery housing 28. In this way, the strike bar 32 is configured to protect the battery housing 28 from objects and bumps along a roadway, for example. Each strike bar 32 is also configured to detach from the mounting structure 30 in a downward direction during a vehicle impact event. In this way, the mounting structure 30 is allowed to absorb energy during the vehicle impact event, thereby protecting the battery housing 28.

Figure 5:
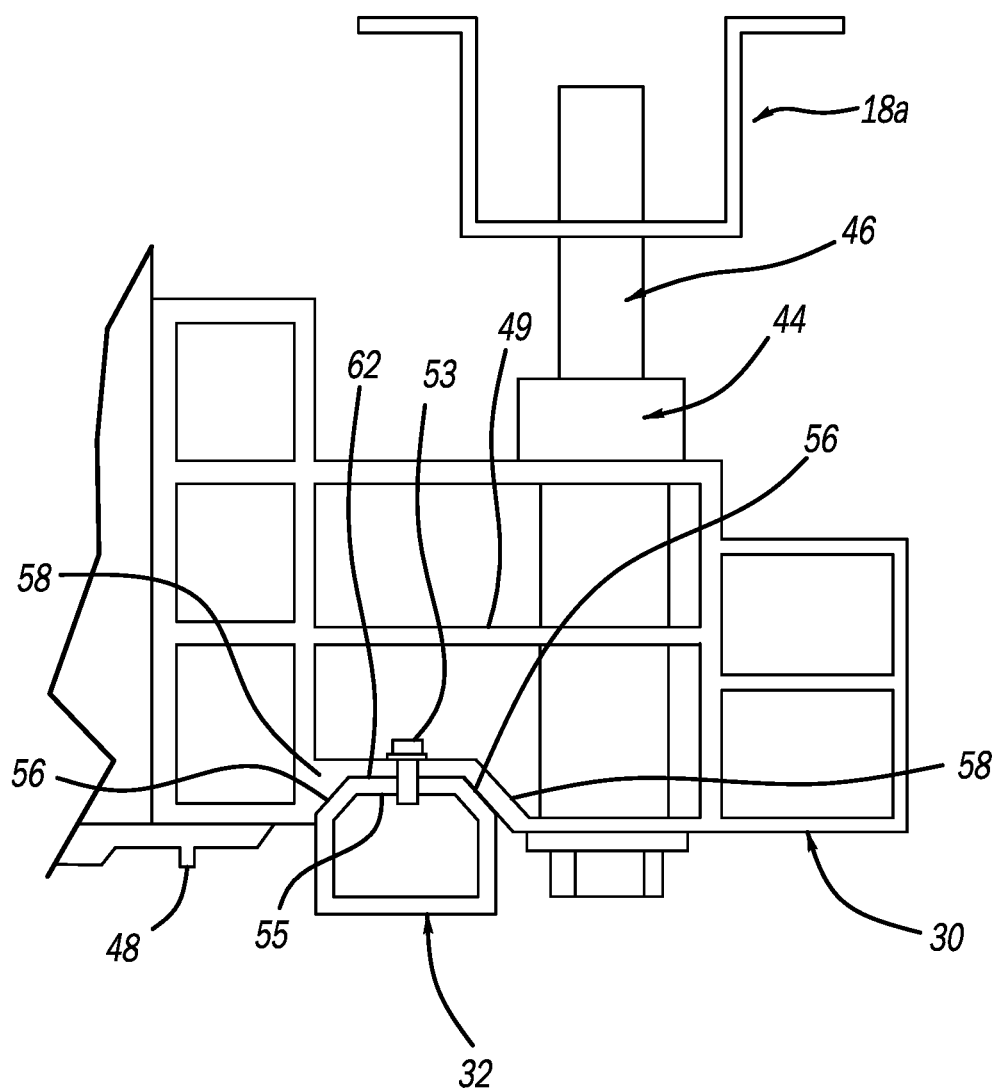
FIG. 5 is a partial back view of the battery housing assembly of FIG. 1 prior to a vehicle impact event.

With reference to FIG. 5, each strike bar 32 is made of a metal material such as aluminum, for example, and is located inboard relative to the mounting posts 44. Stated differently, the strike bar 32 is positioned between the mounting posts 44 and the battery housing 28 at or near a middle area of the mounting structure 30. In the example illustrated, each strike bar 32 extends an entire length of the battery housing 28. In some forms, each strike bar 32 extends only a portion of the battery housing 28. In other forms, some strike bars 32 extend an entire length of the battery housing 28 and some strike bars 32 extend only a portion of the battery housing 28.

Figure 6:
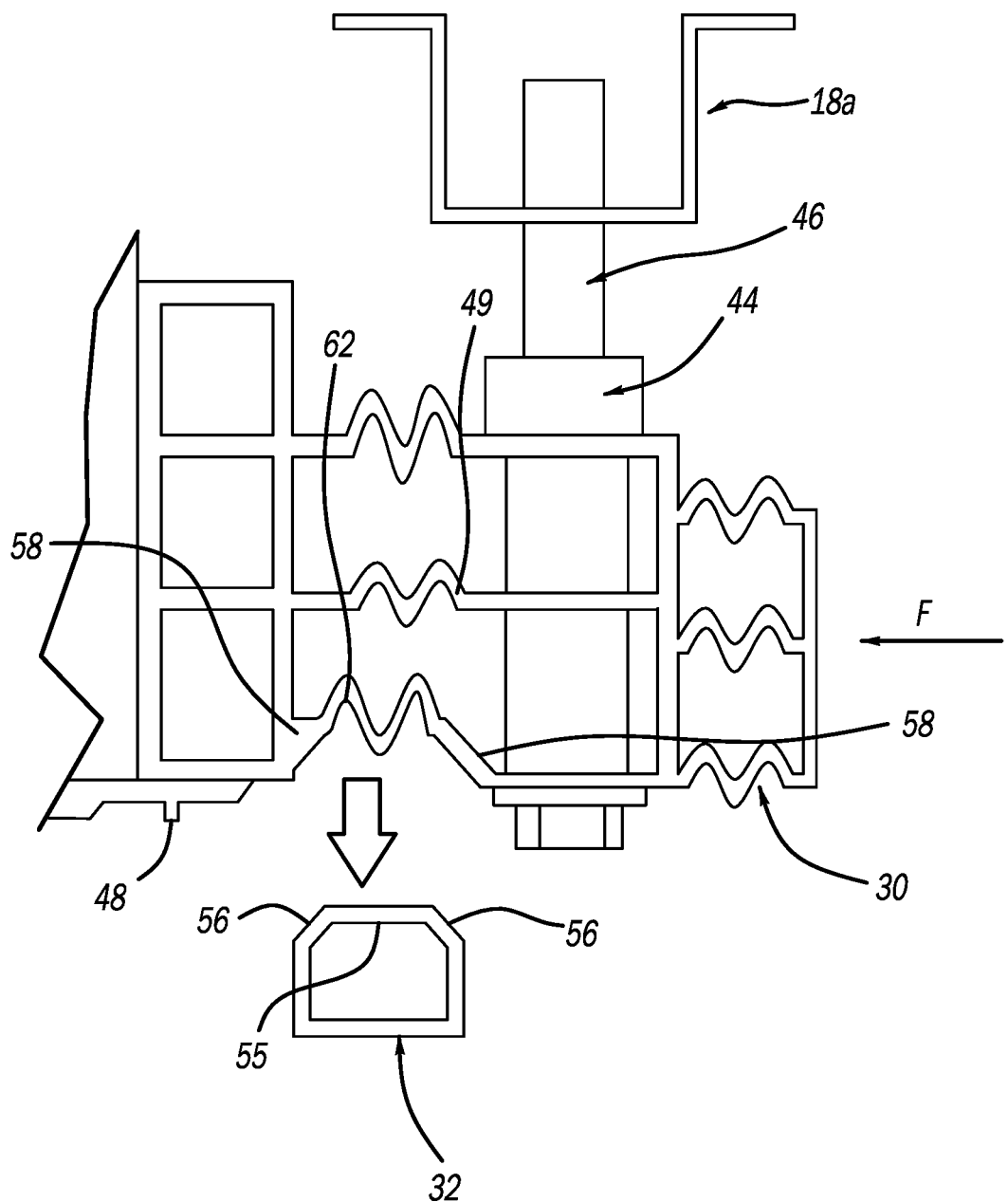
FIG. 6 is a partial back view of the battery housing assembly of FIG. 1 after the vehicle impact event.

Each strike bar 32 is hollow and is generally a rectangular shape. In the example illustrated, each strike bar 32 includes a planar upper wall 55 and a pair of upper end portions 56. Each strike bar 32 also includes a reduced cross-sectional area proximate the end that attaches to the mounting structure 30. A plurality of mechanical fasteners 53 (only one shown in FIG. 5) extend through the planar upper wall 55 and a wall 62 of the mounting structure 30, thereby securing the strike bar 32 to the mounting structure 30. When each strike bar 32 and the mounting structure 30 are secured to each other, the planar upper wall 55 contacts a flat surface of the wall 62 of the mounting structure 30. In some forms, the upper wall 55 is arcuate or curved, for example, as opposed to planar. The pair of upper end portions 56 are tapered inwardly within the recess 54 of the mounting structure 30. The pair of upper end portions 56 correspond to a pair of edges 58 of the mounting structure 30. In this way, during a vehicle impact event as shown in FIG. 6, the mounting structure 30 is crushed, which causes the mounting structure 30 to provide a downward force to the upper end portions 56 of the strike bar 32 to force the strike bar 32 downward, thereby overcoming the tensile force of the fasteners 53 and detaching the strike bar 32 from the mounting structure 30. In some forms, one of the pair of the upper end portions 56 of the strike bar 32 are tapered inwardly and the other of the pair of the upper end portions 56 of the strike bar 32 is square-cut (i.e., forms a right angle).

The upper end portions 56 of the strike bar 32 provide the benefit of facilitating detachment of the strike bar 32 from the mounting structure 30 during the vehicle impact event, thereby allowing the mounting structure 30 to absorb energy from the impact event. In the example illustrated, the upper end portions 56 of the strike bar 32 are tapered along an entire length of the strike bar 32. In some configurations, the upper end portions 56 of the strike bar 32 are tapered only at opposing ends of the strike bar 32. In other configurations, the upper end portions 56 of the strike bar 32 are tapered along some portions of the strike bar 32 and are square-cut, for example, along other upper end portions of the strike bar 32.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery housing assembly for an electric vehicle, the battery housing assembly comprising:
    a battery housing configured to house battery components;
    at least one mounting structure secured to the battery housing and configured to mount the battery housing to a vehicle frame, the at least one mounting structure includes a recess; and
    a strike bar disposed within the recess and secured to the at least one mounting structure, the strike bar extending beyond an exterior profile of the battery housing, the strike bar including an upper end portion that tapers inwardly within the recess,
    wherein the strike bar is configured to detach from the at least one mounting structure in a downward direction during a vehicle impact event.

2. The battery housing assembly of claim 1, wherein the strike bar is made of an aluminum material.

3. The battery housing assembly of claim 1, wherein the strike bar is secured to the at least one mounting structure via mechanical fasteners.

4. The battery housing assembly of claim 1, wherein the strike bar extends an entire length of the battery housing.

5. The battery housing assembly of claim 1, wherein the strike bar includes a lower end portion having a cross-sectional area greater than a cross-sectional area of the upper portion.

6. The battery housing assembly of claim 1, further comprising mounting posts spaced apart along a length of the at least one mounting structure and extending through the at least one mounting structure, and wherein fasteners extend through the mounting posts to secure the battery housing to the vehicle frame.

7. The battery housing assembly of claim 6, wherein the strike bar is located inboard relative to the mounting posts.

8. The battery housing assembly of claim 1, wherein the at least one mounting structure comprises an edge that corresponds to the tapered upper end portion of the strike bar.

9. The battery housing assembly of claim 1, wherein the strike bar includes another upper end portion that tapers inwardly within the recess.

10. The battery housing assembly of claim 9, wherein the at least one mounting structure comprises edges that correspond to the tapered upper end portion of the strike bar and the tapered another upper end portion of the strike bar.

11. The battery housing assembly of claim 1, wherein the at least one mounting structure comprises internal stiffening members.

12. The battery housing assembly of claim 1, wherein the at least one mounting structure and the strike bar are made of an aluminum material.

13. A battery housing assembly for an electric vehicle, the battery housing assembly comprising:
    a battery housing configured to house battery components;
    at least one battery frame secured to the battery housing and configured to mount the battery housing to a vehicle frame, the at least one battery frame including a recess; and
    a strike bar disposed within the recess and secured to the at least one battery frame, the strike bar extending beyond an exterior profile of the battery housing, the strike bar including an upper end portion that tapers inwardly within the recess, the strike bar comprising a stiffness that is greater than a stiffness of the at least one battery frame,
    wherein the strike bar is configured to detach from the at least one battery frame in a downward direction during a vehicle impact event.

14. The battery housing assembly of claim 13, wherein the strike bar is made of an aluminum material.

15. The battery housing assembly of claim 13, wherein the strike bar is secured to the at least one battery frame via mechanical fasteners.

16. The battery housing assembly of claim 13, wherein the strike bar extends an entire length of the battery housing.

17. The battery housing assembly of claim 13, further comprising mounting posts spaced apart along a length of the at least one battery frame and extending through the at least one battery frame, and wherein fasteners extend through the mounting posts to secure the battery housing to the vehicle frame.

18. The battery housing assembly of claim 17, wherein the strike bar is located inboard relative to the mounting posts.

19. The battery housing assembly of claim 13, wherein the at least one battery frame comprises internal stiffening members.

20. A battery housing assembly for an electric vehicle, the battery housing assembly comprising:

a battery housing configured to house battery components;

at least one battery frame secured to the battery housing and configured to mount the battery housing to a vehicle frame, the at least one battery frame includes a recess having an edge;

mounting posts spaced apart along a length of the at least one battery frame and extending through the at least one battery frame;

fasteners extending through the mounting posts to secure the battery housing to the vehicle frame; and a strike bar disposed within the recess and secured to the at least one battery frame, the strike bar extending beyond an exterior profile of the battery housing and located inboard relative to the mounting posts, the strike bar including an upper end portion that tapers inwardly within the recess, the edge of the recess corresponds to the tapered upper end portion of the strike bar, wherein the strike bar is configured to detach from the at least one battery frame in a downward direction during a vehicle impact event.

\* \* \* \* \*